(12) United States Patent
Matama

(10) Patent No.: US 6,339,466 B1
(45) Date of Patent: Jan. 15, 2002

(54) IMAGE PROCESSING APPARATUS

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/327,954

(22) Filed: Jun. 8, 1999

(30) Foreign Application Priority Data

Jun. 8, 1998 (JP) ............................................. 10-159492

(51) Int. Cl.[7] ......................... G03B 27/68; G03B 27/52; G06K 9/40
(52) U.S. Cl. .............................. 355/52; 355/40; 382/275
(58) Field of Search ............................... 355/52, 55, 40, 355/56; 358/463, 444, 448; 382/275

(56) References Cited

U.S. PATENT DOCUMENTS 5,461,440 A * 10/1995 Toyoda et al. ............... 358/444
5,751,863 A * 5/1998 Farr ........................... 358/463
5,995,201 A * 11/1999 Sakaguchi .................... 355/55

FOREIGN PATENT DOCUMENTS

| JP | 6165024 | 6/1994 |
|---|---|---|
| JP | 6236004 | 8/1994 |
| JP | 6237376 | 8/1994 |
| JP | 6250276 | 9/1994 |
| JP | 6250277 | 9/1994 |
| JP | 9281613 | 10/1997 |

* cited by examiner

Primary Examiner—Russell Adams
Assistant Examiner—Peter B. Kim

(57) ABSTRACT

An image processing apparatus that includes a determining section for determining whether or not read-in image data of an image recorded on a photographic film will require distortion aberration correction for correcting distortion caused by a photographing lens employed to record the image on the photographic film. Additionally, a reading-range setting section is included for setting an image reading range to be substantially the same range that is used for an output image, when a determination has been made that distortion aberration correction is not required. Alternatively, the reading-range setting section sets the image reading range to be larger than the range used for the output image by a predetermined amount, when it is determined that distortion aberration correction is required. As a result, missing image regions on the output image can be prevented.

30 Claims, 12 Drawing Sheets

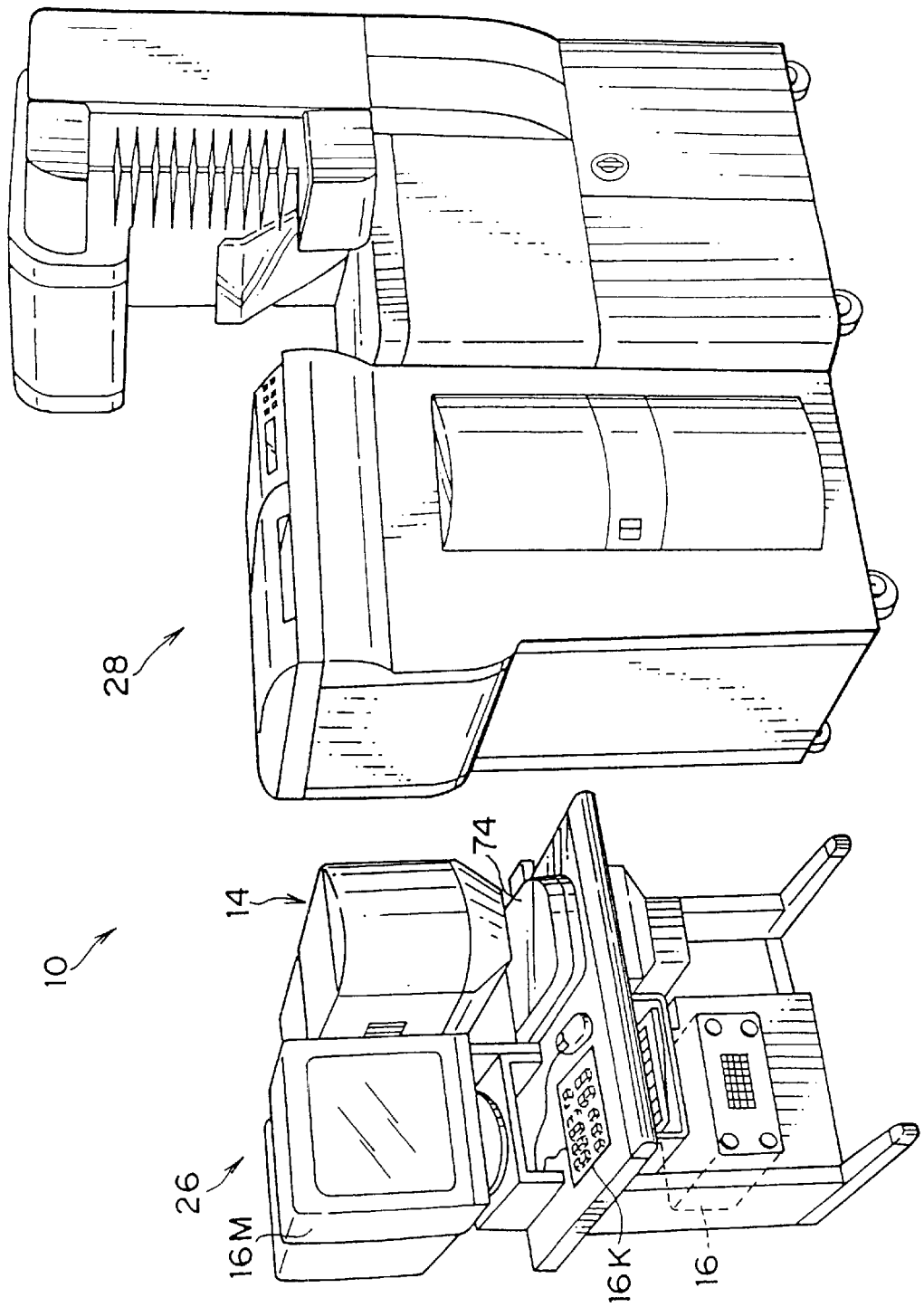
F I G. 2

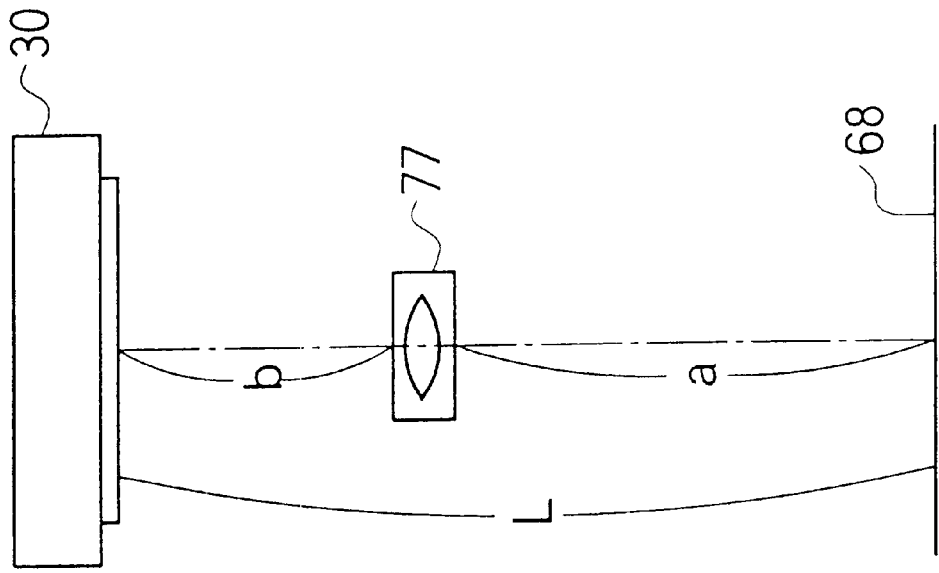
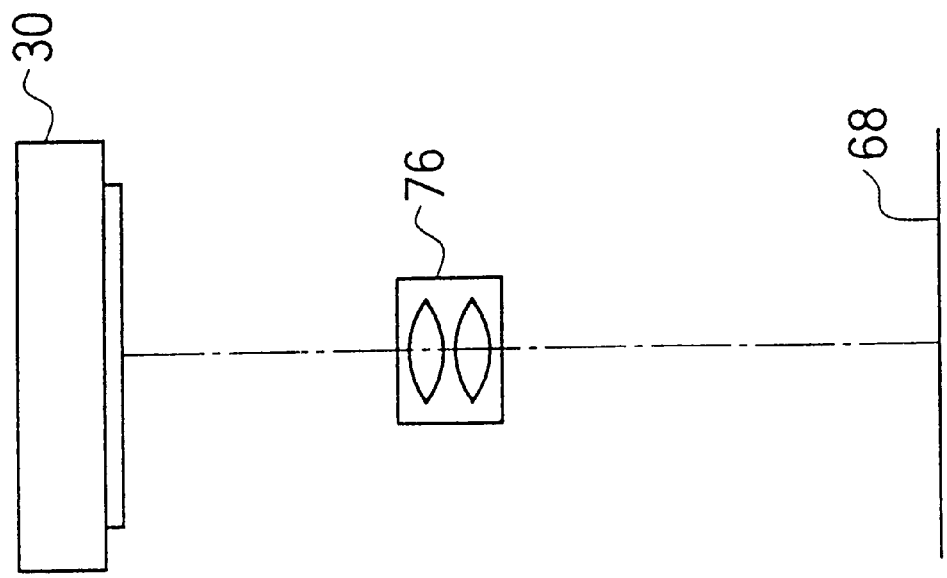

IMAGE PROCESSING APPARATUS

BACKGROUND OF THE INVENTION

1. Field of the Invention

The present invention relates to an image processing apparatus, and particularly relates to an image processing apparatus for obtaining image data to be output, by subjecting, to predetermined image processing, image data obtained by photoelectrically reading an image recorded on a photographic film.

2. Description of the Related Art

In recent years, a technique has been known with which frame images recorded on a photographic film are photoelectrically read by a reading sensor such as a CCD. Digital image data obtained by the reading operation is subjected to image processing including enlargement/reduction and various correction processes. Then, a laser beam modulated in accordance with processed digital image data is used to form an image on a recording material.

In the technique for digitally reading frame images by using a reading sensor such as a CCD, in order to realize accurate image reading, a frame image is read (performing so-called "prescan"). Thus, reading conditions (for example, the amount of light with which the frame image is illuminated and charge storage time in the CCD) corresponding to, for example, the density of the frame image are determined. Under the decided reading conditions, the frame image is again read (so-called "fine scan").

A frame image photographed by a lens-fitted film package or a film with a lens becomes distorted, as shown in FIG. 8A. The distortion is caused by the distortion aberration of the photographing lens provided in a camera. The degree of the distortion of the image varies depending on the type (for example, the model, the trade name, the telephoto lens, or the wide angle lens, and the like) of the photographing lens. That is, the amount of the distortion aberration varies depending on the type of the photographic lens. If the amount of the distortion aberration is great, distortion of the image is enlarged. If the amount of the distortion aberration is small, distortion of the image is reduced. If the frame image recorded on a photographic film is distorted, reading of the frame image and using read image data to form an image on a recording material result in formation of an image having distortion.

An image processing apparatus has been disclosed with which information about the type of the photographing lens provided for a camera is obtained in advance. In accordance with the obtained information, digital image data is subjected to an image process (correction of distortion aberration) (refer to Japanese Patent Application Laid-Open (JP-A) Nos. 9-281613, 6-250276, 6-250277, 6-237376, 6-236004 and 6-165024). The distortion aberration correction is a process for correcting distortion of the image caused by the distortion aberration of the photographing lens. Since the distortion aberration correction is performed as described above, digital image data which must be output can be obtained. Digital image data which must be output is used to form an image on a recording material. As a result, an image free from distortion can be formed on the recording material.

However, when an image is formed on a recording material by using digital image data which has been subjected to the correction of distortion aberration and which must be output, uncertain pixels are formed in the periphery of the image, as shown in FIG. 8B. This leads to a fact that an image with edges is undesirably formed on the recording material. Therefore, the following process is usually performed: pixels (in a range indicated with arrows G shown in FIG. 8B) in the periphery having uncertain pixels are out. Then, only pixels on the inside are used to form an image. A region, the image of which has not been formed on the recording material due to the cutting operation, is called an missing image region. If an important object is photographed on the periphery of this missing image region, the foregoing method results in the fact that the important object is not reproduced on the recording material. Therefore, the foregoing method sometimes leads to problems. If an image of a group of persons or the like, in which persons are in the overall region, is formed, person in a corner is sometimes not reproduced on the recording material.

When digital image data, which must be output and which is obtained by subjecting digital image data obtained by reading a frame image to correction of distortion aberration in accordance with information about the photographing lens, is used to form an image on a recording material, an image having uncertain pixels in the periphery is undesirably formed. That is, there arises a problem in that the image formed on the recording material has a missing image region.

SUMMARY OF THE INVENTION

To overcome the above-mentioned problem, an object of the present invention is to provide an image processing apparatus which is capable of preventing missing image regions caused by execution of the correction of distortion aberration.

To achieve the foregoing object, according to a first aspect of the present invention, there is provided an image processing apparatus comprising: determining means for determining whether or not image data obtained by reading an image recorded on a photographic film must be subjected to distortion aberration correction for correcting distortion of an image caused by distortion aberration of a photographing lens employed when the image is recorded on the photographic film; and reading-range setting means for setting an image reading range to be substantially the same as a range for use as an output image when a determination has been made by said determining means that the distortion aberration correction is not required and for setting the image reading range to be a range larger than the range for use as the output image by a predetermined amount when a determination has been made that the distortion aberration correction must be performed.

The image processing apparatus according to the first aspect incorporates the determining means for determining whether or not image data obtained by reading an image recorded on a photographic film must be subjected to the distortion aberration correction, which is an image process. The distortion aberration correction is a process for correcting distortion of an image caused by distortion aberration of the photographing lens employed to record the image on the photographic film. The determining means is able to make the determination in accordance with information about the photographing lens. For example, camera type identification information for identifying the type of the camera used in photographing the image (including cases in which information expressing that photography was carried out by using a lens-fitted film package is recorded on the photographic film) may be used as the information about the photographing lens.

The image processing apparatus according to the first aspect incorporates the reading-range setting means for setting the image reading range recorded on the photographic film. The reading-range setting means sets the image reading range in accordance with a result of the determination made by the determining means. If the determining means determines that image data obtained by reading the image recorded on the photographic film does not require to be subjected to the distortion aberration correction, a range substantially the same as the range for use as the output image is set as the image reading range. If the determining means determines that the distortion aberration correction must be performed, a range larger than the range for use as the output image by a predetermined amount is set as the image reading range. Note that the output image includes an image recorded on a recording material such as a light-sensitive material, an image displayed on display means such as a monitor, and an image stored in an information recording medium.

The set image reading range is read, and then image data obtained by subjecting the read image data to the distortion aberration correction is used to obtain an output image. Thus, missing image regions in the output image can be prevented.

A second aspect has a structure according to the first aspect, further comprising lens-information obtaining means for obtaining information about the photographing lens, wherein when said determining means has determined that the distortion aberration correction must be performed, said reading-range setting means obtains a range which can be used as an output image on an image indicated with image data subjected to the distortion aberration correction performed in accordance with information about the photographing lens obtained by said lens-information obtaining means and calculates and sets an image reading range in accordance with the size of the usable range.

The image processing apparatus according to the second aspect incorporates the lens-information obtaining means for obtaining information about the photographing lens employed when the image has been recorded on the photographic film. Information about the photographing lens includes, for example, the model number, the trade name, information about the photographing lens, such as a telephoto lens or a wide angle lens. The lens-information obtaining means may have a structure where a lens identification code in the form of a bar code or the like is previously formed on the photographic film so as to be read by a sensor. If the photographic film is an APS film, lens identification data is magnetically recorded on a magnetic recording layer when the image has been photographed so as to be read by a magnetic head.

The reading-range setting means provided for the image processing apparatus according to this embodiment, when the determining means has determined that the distortion aberration correction must be performed, obtains a range which can be used as an output image on an image indicated with image data subjected to the distortion aberration correction performed in accordance with information about a photographing lens obtained by the lens-information obtaining means and calculates and sets an image reading range in accordance with the size of the usable range. Specifically, the reading range can be calculated in accordance with the ratio of the size of the range which can be used as the output image on the image indicated with image data before the distortion aberration correction and the size of a range which can be used as the output image on the image indicated with image data subjected to the distortion aberration correction.

In a third aspect of the present invention, the image processing apparatus according to the first aspect further comprises a lens-information obtaining means for obtaining information about the photographing lens. The reading-range setting means stores in advance reading ranges of images in correspondence with a plurality of information on photographing lenses. When the determining means determines that distortion aberration correction must be performed, the reading-range setting means reads and sets an image reading range which corresponds to the information on the photographing lens obtained by the lens-information obtaining means.

The image processing apparatus according to the third aspect comprises the lens-information obtaining means for obtaining information about the photographing lens, i.e., for obtaining information about the photographing lens employed at the time the image is recorded on the photographic film. The reading-range setting means provided at the image processing apparatus has stored in advance image reading ranges corresponding to respective information on a plurality of photographing lenses. When the determining means determines that distortion aberration correction must be carried out, the reading-range setting means reads and sets an image reading range which corresponds to the information on the photographing lens obtained by the lens-information obtaining means. As a result, when the distortion aberration correction is performed, simply reading previously stored information allows setting of the image reading range. Therefore, the number of processings required can be reduced.

Here, the reading range is the scan range of the photographic film which is read by the image reading means which reads images recorded on photographic films.

Further, when the image reading means is an area sensor for reading the image in areas, the reading-range setting means may change the scan range by changing the optical magnification of the area sensor. In this case, when the determining means determines that distortion aberration correction must be performed, the reading-range setting means may set the optical magnification to a predetermined fixed value such that the reading range of the image is a range which is larger, by a predetermined amount or more, than the range used as the output image.

When the image reading means is a line sensor for reading the image in lines, the reading-range setting means may change the scan range by changing at least one of the optical magnification and the subscanning range of the line sensor. In this case, due to the reading-range setting means changing the optical magnification of the line sensor, the scan range can be changed. When the determining means determines that the distortion aberration correction must be performed, the reading-range setting means may set the optical magnification to a predetermined fixed value such that the reading range of the image becomes a range which is larger, by a predetermined amount or more, than the range used as the output image.

This "reading range" is not limited to the scan range of the photographic film read by the reading means. A storing means for storing image data obtained by the reading of the image recorded on the photographic film may be provided, and the reading range may be a range of image data read from the storing means.

A changing means for changing the electronic magnification may be provided in order to have the output image be a predetermined size.

BRIEF DESCRIPTION OF THE DRAWINGS

FIG. 2 is a diagram showing an exterior appearance of the digital laboratory system.

FIGS. 9A and 9B are diagrams showing concrete examples of methods of enlarging a scan area.

DESCRIPTION OF THE PREFERRED EMBODIMENTS

Figure 1:
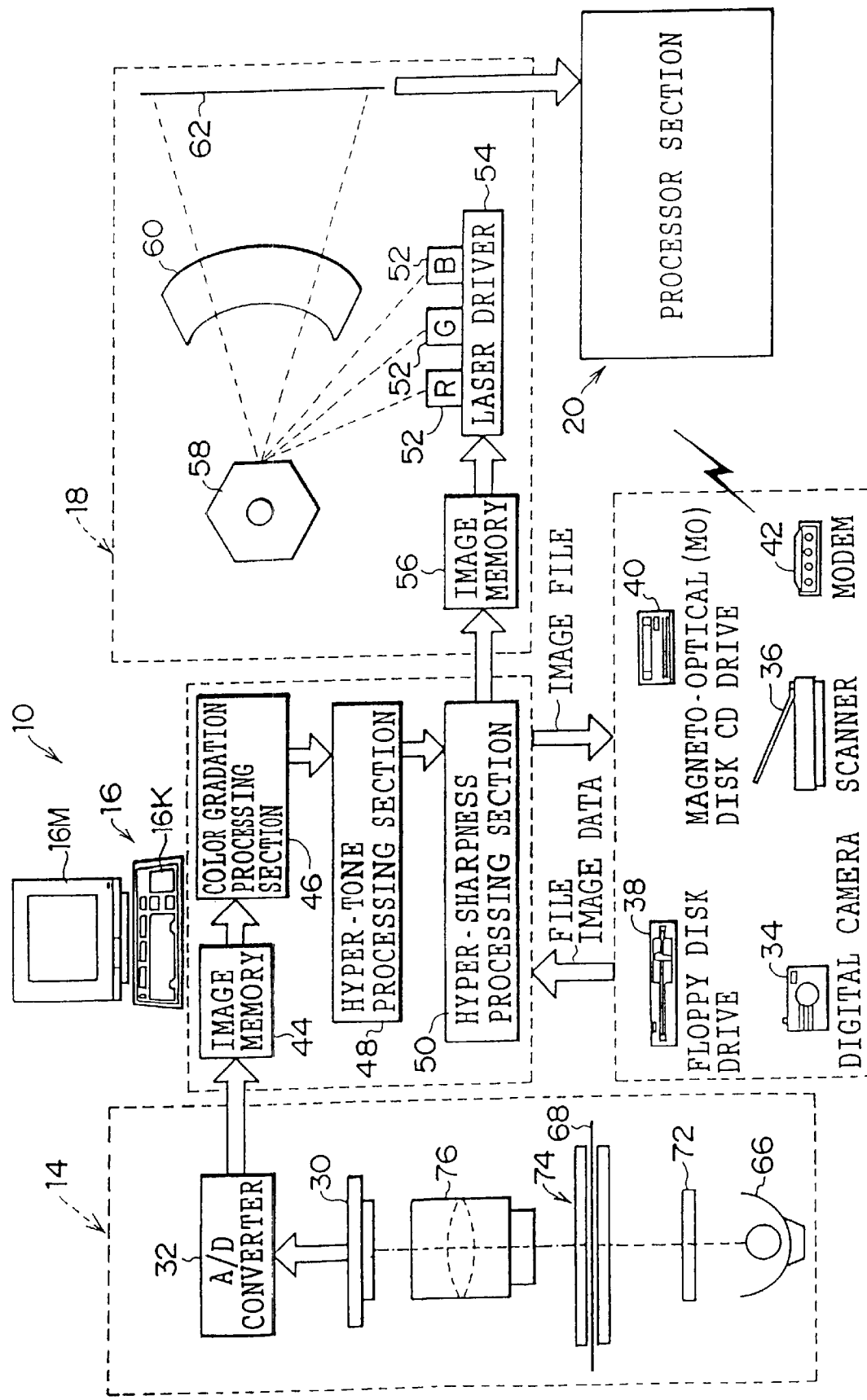
FIG. 1 is a schematic view showing a structure of a digital laboratory system according to an embodiment of the present invention.

Referring to the drawings, an embodiment of the present invention will now be described. A digital laboratory system according to this embodiment will now be described.
Schematic Structure of Overall System
FIGS. 1 and 2 show the schematic configuration of a digital laboratory system 10 according to this embodiment.

As shown in FIG. 1, the digital laboratory system 10 incorporates a line CCD scanner 14, an image processing section 16, a laser printer section 18 and a processor section 20. The line CCD scanner 14 and the image processing section 16 are unified into an input section 26 shown in FIG. 2. The laser printer section 18 and the processor section 20 are unified into an output section 28 shown in FIG. 2.

The line CCD scanner 14 reads a frame image recorded on a photographic film, such as a negative film or a reversal film. For example, the photographic film may be a 135-size photographic film, a 110-size photographic film, a photographic film having a transparent magnetic layer (a 240-size photographic film which is a so-called "APS film"), a 120-size photographic film or a 220-size photographic film (a Brownie size). The line CCD scanner 14 incorporates a line CCD 30 which reads the frame image which must be read to cause an A/D converting section 32 to A/D-convert the frame image. Then, the line CCD scanner 14 outputs image data to the image processing section 16.

In this embodiment, the 240-size photographic film (the APS film) 68 is applied to the digital laboratory system 10. The APS film causes any one of selected size C (having an aspect ratio of 2:3), size H (having an aspect ratio of 9:16) and size P (photographed such that the width is narrowed as compared with the size C image) photographed by a camera to be photographed to have size H. That is, size H frame images are recorded on the photographic film 68.

The image processing section 16 is supplied with image data (scan image data) output from the line CCD scanner 14. Moreover, the image processing section 16 is able to receive, from outside, image data obtained by a photographing operation performed by a digital camera 34 or the like, image data obtained by the operation of a (flat bed) scanner 36 to read an original document (for example, a reflective copy), image data produced by another computer and recorded in a floppy disk drive 38, a magneto-optical (MO) disk drive or a CD drive 40 and communicated image data received through a modem 42 (note that foregoing image data are collectively called "file image data").

The image processing section 16 stores supplied image data in an image memory 44 to subject image data to various image processing, such as correction, which are performed by a color gradation processing section 46, a hyper-tone processing section 48 and a hyper-sharpness processing section 50. Then, the image processing section 16 outputs image data above to the laser printer section 18 as image data to be recorded. Moreover, the image processing section 16 is able to output image data subjected to the image processing to the outside as image files (for example, output the same to a storage medium, such as an FD, a magneto-optical disk (MO) drive or a CD or transmit the same to another information processing apparatus through a communication line).

The laser printer section 18 is provided with R, G and B laser light sources 52. The laser printer section 18 controls a laser driver 54 to illuminate photographic paper with a laser beam modulated in accordance with image data to be recorded (which is temporarily stored in the image memory 56) supplied from the image processing section 16. Thus, scanning and exposure (by an optical system comprising a polygonal mirror 58 and a fθ lens 60 in this embodiment) are performed so that an image is recorded on photographic paper 62. A processor section 20 subjects the photographic paper 62, on which the image has been recorded according to the scanning and exposing performed in the laser printer section 18, to color development, bleaching and fixing, rinsing and drying processing. As a result, an image is formed on the photographic paper.
Configuration of Line CCD Scanner The configuration of the line CCD scanner 14 will now be described. FIG. 1 shows a schematic configuration of an optical system of the line CCD scanner 14. The optical system is provided with a light source 66 for illuminating the photographic film 68 with light. A light diffusing plate 72 for converting light with which the photographic film 68 is illuminated into diffused light is disposed adjacent to the light-emitting side of the light source 66.

The photographic film 68 is moved by a film carrier 74 disposed adjacent to the light diffusing plate 72 such that the center of the frame image coincides with the optical axis.

A lens unit 76 for focusing light allowed to pass through the frame image and the line CCD 30 are disposed opposite to the light source 66 through the photographic film 68, the foregoing elements being sequentially disposed in the direction of the optical axis. Although the illustrated lens unit 76 comprises a single lens, the lens unit 76 is a zoom lens composed of a plurality of lenses. Note that the lens unit 76 may be a SELFOC lens. In this case, it is preferable that the two end surfaces of the SELFOC lens are positioned as close as possible to the photographic film 68 and the line CCD 30, respectively.

The line CCD 30 incorporates sensing sections each having a plurality of CCD cells disposed in a line in the direction of the width of the photographic film 68 which is conveyed. Each sensing section has an electronic shutter mechanism. Three parallel lines of the sensing sections are disposed apart from each another. Anyone of R, G and B color separation filters is joined to the light-incident side of each sensing section (that is, what is know as a three-line color CCD is formed). The line CCD 30 is disposed such that the light receiving surface of each of the sensing sections is disposed at the focusing position of the lens unit 76.

A shutter (not shown) is disposed between the line CCD 30 and the lens unit 76.

Configuration of Control System of Image Processing Portion 16

Figure 3:
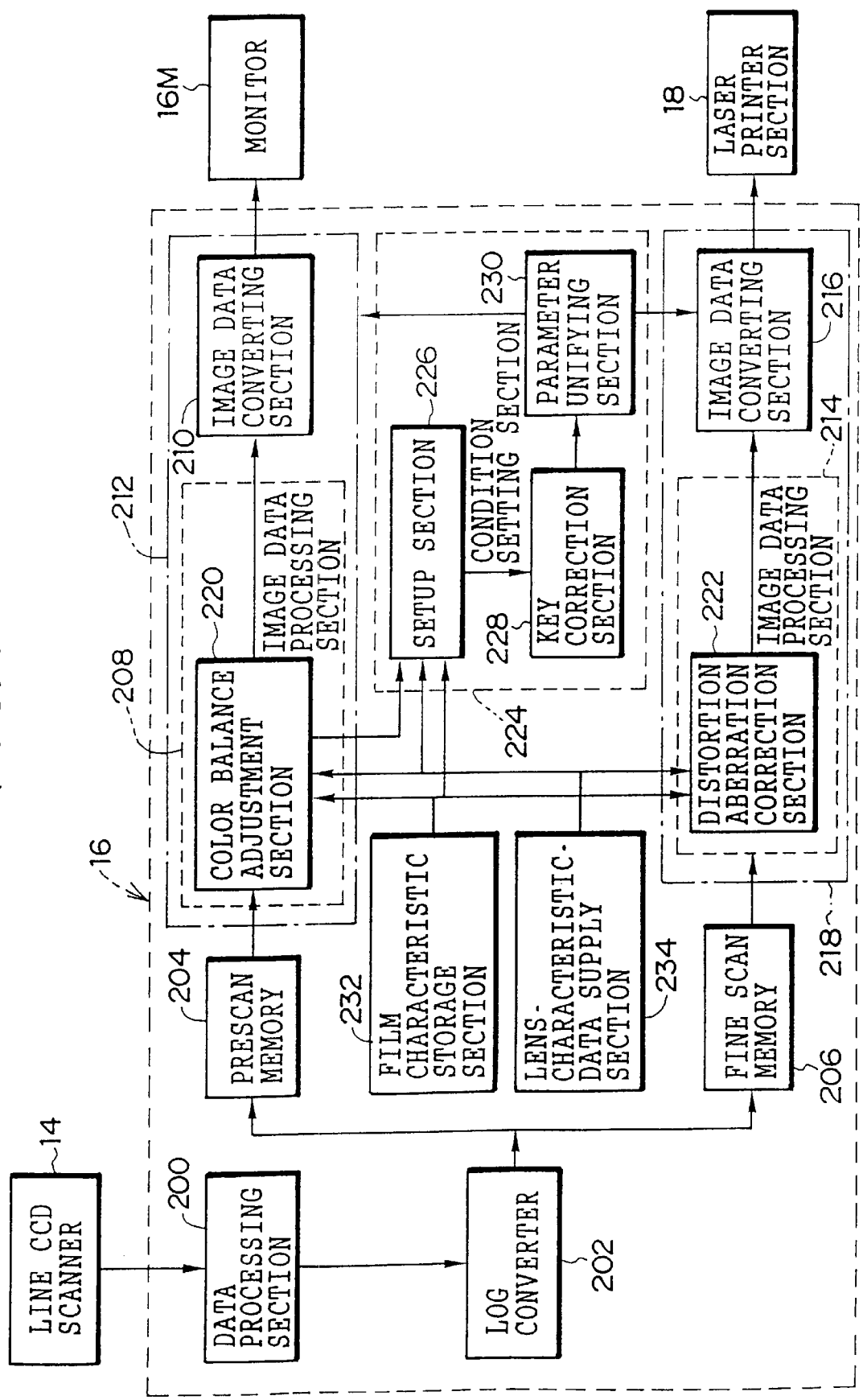
FIG. 3 is a control block diagram showing an image processing section.

FIG. 3 is a control block diagram for performing processes which are performed by the image memory 44, the color gradation processing section 46, the hyper-tone processing section 48 and the hyper-sharpness processing section 50 which are main components of the image processing section 16 shown in FIG. 1.

R, G and B digital signals output from the line CCD scanner 14 are, in a data processing section 200, subjected to predetermined data processing including dark correction, correction of defective pixels and shading correction. Then, digital signals are converted into digital image data (density data) by a log converter 202. Prescan data is stored in a prescan memory 204, while fine scan data is stored in a fine scan memory 206.

Prescan data stored in the prescan memory 204 is transmitted to a prescan processing section 212 composed of an image data processing section 208 and an image data converting section 210. On the other hand, fine scan data stored in the fine scan memory 206 is transmitted to a fine scan processing section 218 composed of the image data processing section 214 and the image data converting section 216.

The prescan processing section 212 and the fine scan processing section 218 perform corrections in accordance with information about the photographing lens provided for the camera with which the image has been photographed. Information about the photographing lens includes the model number, the trade name and whether or not the lens is a telephoto lens and whether or not the lens is a wide angle lens. Further, camera type identification information for identifying the type of the camera used in photographing the image (including cases in which information expressing that. photography was carried out by using a lens-fitted film package is recorded on the photographic film) may be used as the information about the photographing lens.

Each of the image data processing sections 208 and 214 is provided with a color balance adjustment section 220 (that for the image data processing section 214 is omitted from illustration) so that color balance adjustment is performed. In addition to the color balance adjustment, contrast adjustment (a color gradationprocess), brightness correction, saturation correction (a hyper-tone process) and a hyper-sharpness process are performed by a known method using a LUT or a matrix (MTX).

The image data processing section 214 is provided with a distortion aberration correction section 222 for correcting distortion of an image caused from the distortion aberration of the photographing lens with which the image has been photographed, the correction being performed before each of adjustment and correction and the like are performed.

The image data converting section 210 for the prescan section converts image data processed by the image data processing section 208 into image data to be displayed on a monitor 16M in accordance with a 3D-LUT. On the other hand, the image data converting section 216 for the fine scan section converts image data processed by the image data processing section 214 into image data to be printed by the laser printer section 18 in accordance with a 3D-LUT. Note that the color systems, which are different between image data, which must be displayed, and image data to be printed, are made to coincide with each other by performing a variety of correction processes.

A condition setting section 224 is connected to the prescan processing section 212 and the fine scan processing section 218. The condition setting section 224 incorporates a setup section 226, a key correction section 228 and a parameter unifying section 230.

Figure 5:
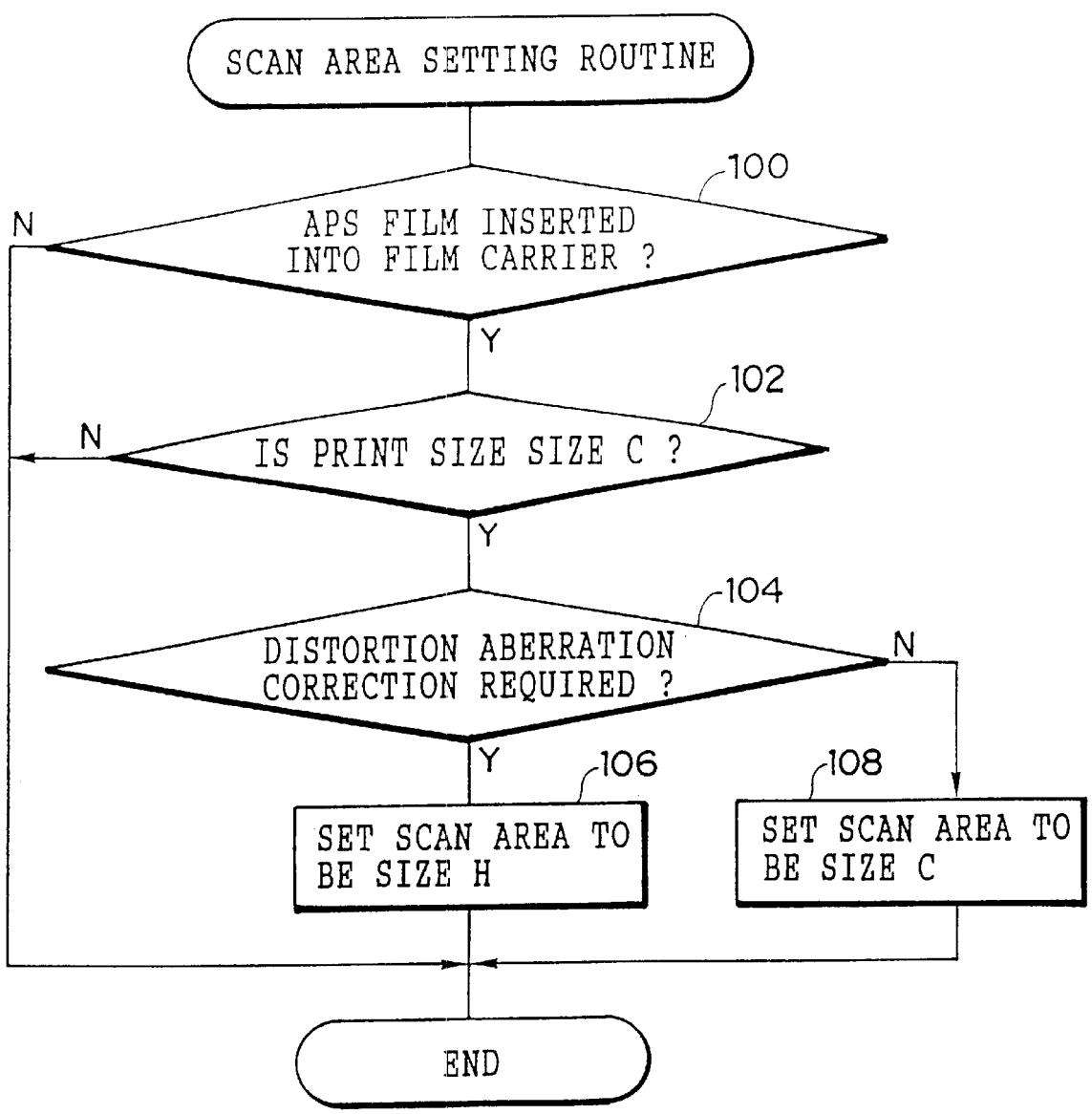
FIG. 5 is a flowchart of a scan area setting routine.

The setup section 226 is structured to include a microcomputer comprising a CPU, a ROM, a RAM and an input/output port (not shown). The setup section 226 uses prescan data to set reading conditions for the fine scanning operation to communicate the reading conditions to the line CCD scanner 14. The reading conditions for the fine scanning operation include a scan area which is determined in accordance with the characteristic (the distortion aberration) of the photographing lens. That is, a scan area setting routine shown in FIG. 5 is stored in advance in the setup section 226. When the scan area setting routine is executed, the scan area in the fine scanning operation is set. The scan area setting routine will be described later.

Moreover, the setup section 226 calculates image processing conditions for the prescan processing section 212 and the fine scan processing section 218 to supply the image processing conditions to the parameter unifying section 230. The image processing conditions includes a condition under which the distortion aberration correction section 222 of the image data processing section 214 corrects the distortion aberration of fine scan data. The foregoing condition is determined in accordance with the amount of distortion aberration of the photographing lens, that is, the degree of distortion of the image occurring due to the distortion aberration of the photographing lens.

In accordance with various instructions input by keys provided for a keyboard 16K and/or mouse for adjusting the density, color, contrast, sharpness and saturation, the key correction section 228 calculates an amount of adjustment of the image processing conditions so as to communicate a result of the calculation to the parameter unifying section 230.

The parameter unifying section 230 communicates the image processing conditions received from the setup section 226 and the key correction section 228 to the image data processing sections 208 and 214 in the prescan section and the fine scan section so as to correct or reset the image processing conditions.

A film characteristic storage section 232, in which the characteristics of various films are stored, is connected to the image data processing sections 208 and 214. The characteristics of the film is a gradation characteristic ($\gamma$ characteristic) which is usually expressed by a curve indicating the density which is three-dimensionally changed in accordance with the amount of exposure. Since the above-mentioned fact is a known technique, the foregoing fact is omitted from description. The film characteristic storage section 232 is connected to the setup section 226 as well. In addition to the characteristics of the films, information about the type of the photographic film 68 inserted into the film carrier 74 is stored in the film characteristic storage section 232. Information about the type of the film is supplied to the setup section 226.

Figure 4:
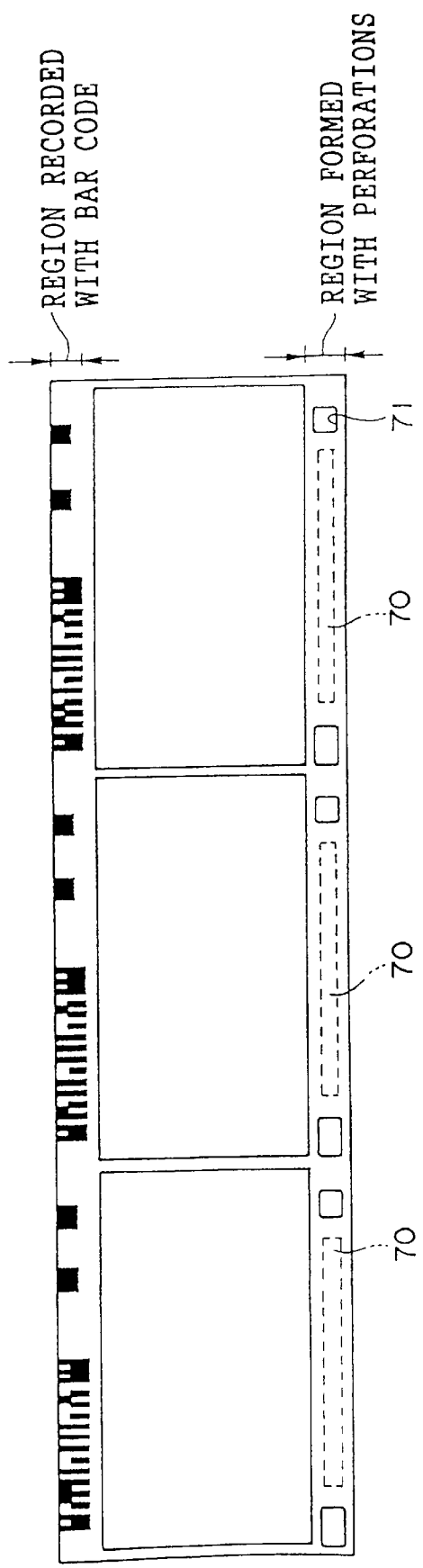
FIG. 4 is an enlarged view showing a photographic film (an APS film).

Since the photographic film 68 is the APS film in this embodiment, information about the type of the film is recorded in a magnetic recording layer 70 as shown in FIG. 4. Therefore, information about the type of the film obtained when a magnetic head (not shown) has read the magnetic recording layer 70 during conveyance of the photographic film 68 by the film carrier 74 of the line CCD scanner 14 is stored in the film characteristic storage section 232.

A lens-characteristic-data supply section 234 is connected to the image data processing sections 208 and 214 and the condition setting section 224. The lens-characteristic-data supply section 234 communicates, to the setup section 226 and so forth, the characteristics of the photographing lens provided for the camera with which the image has been photographed.

In the case of this embodiment in which the photographic film 68 is the APS film, also information about the photographing lens is recorded in the magnetic recording layer 70 similarly to information about the type of the film. Therefore, when the magnetic head reads the magnetic recording layer 70 during the conveyance of the photographic film 68 by the film carrier 74, information about the photographing lens can be obtained. Obtained information about the photographing lens is stored in the lens-characteristic data supply section 234.

Operation of Embodiment

Operation of this embodiment will now be described.

The operator inserts the photographic film 68 into the film carrier 74, and then instructs start of the image reading operation by operating the keyboard 16K of the image processing section 16. Thus, the film carrier 74 starts moving the photographic film 22. As a result of the movement, the prescanning operation is started. While the photographic film 68 is being moved at relatively high speed, the line CCD scanner 14 reads various data items recorded in a section outside of the image recording region of the photographic film 68 in addition to the frame images. Therefore, information about the type of the photographic film 68 recorded in the magnetic recording layer 70 of the photographic film 68 and information about the photographing lens provided for the camera are simultaneously read.

After prescan data has been stored in the prescan memory 204, the prescan processing section 212 performs a variety of adjustment processes including color balance adjustment and contrast adjustment and various correction processes including brightness correction and saturation correction. An image based on image data which has been obtained by correcting prescan data and which must be displayed is displayed on the monitor 16M.

After the prescanning operation has been completed, reading conditions for the fine scanning operation are set to each of the frame image in accordance with prescan data of each frame image. The reading conditions include a scan area of the frame image. A method of setting the scan area will now be described with reference to a scan area setting routine shown in FIG. 5.

In step 100 a determination is made as to whether or not the photographic film 68 inserted into the film carrier 74 is an APS film. The determination can automatically be performed in accordance with the width of the photographic film 68 or the shape of perforations 71. As an alternative, the operator may visually determine and indicate the type of the film (135-size/APS).

If a determination is made in step 100 that the photographic film 68 inserted into the film carrier 74 is an APS film, the operation is shifted to step 102. In step 102 whether or not the size (the print size) of the image to be printed on the photographic paper 62 by the laser printer section 18 is size C. Information about the print size has been recorded in the magnetic recording layer 70 of the photographic film 68. When the prescanning operation is performed, information about the print size can be obtained when the magnetic head reads the magnetic recording layer 70.

If a determination is made in step 102 that the print size is the size C, the operation is shifted to step 104. Thus, a determination is made whether or not image data obtained by the prescanning operation must be subjected to correction of distortion aberration. The correction of distortion aberration is a process for correcting distortion of the image caused from the distortion aberration of the photographing lens provided for the camera. The distortion of the image varies depending on the amount of the distortion aberration of the photographing lens, that is, the type of the photographing lens. Therefore, when the type of the photographing lens provided for the camera is detected, whether or not the distortion aberration correction must be performed can be determined. Information about the photographing lens can be obtained by causing the magnetic head to read the magnetic recording layer 70 of the photographic film 68. Obtained information about the photographing lens is supplied from the lens-characteristic-data supply section 234 to the setup section 226 so that the type of the photographing lens is determined.

If a determination is made in step 104 that the distortion aberration correction must be performed, the operation is shifted to step 106. In step 106 the scan area for the fine scan is set to size H. That is, the scan area is set to be capable of reading the overall frame image recorded on the photographic film 68. In this embodiment, a scan area is set that is larger than the print size by a predetermined amount in the longitudinal direction (the sub-scanning direction) of the photographic film 68. The reason for this lies in that the lens attached film is sometimes structured such that the photographic film 68 is warped in the longitudinal direction to reduce the field curvature aberration. In this case, the distortion aberration of the lens in the longitudinal direction is compensated and, therefore, reduced. In this case, the distortion of a straight line in the direction of the shorter side (in the main scanning direction) of the frame image recorded on the photographic film 68 is enlarged. Therefore, the scan area must be enlarged a predetermined amount in the sub-scanning direction. Therefore, when the scan area is set to be the size H, which is larger than the size C in the sub-scanning direction, missing image regions can be prevented. In this embodiment, the scan area is enlarged to the size H. As a matter of course, the amount of the enlargement is sufficient if the missing image regions can be minimized. Since distortion of a straight line in the direction of the longer side is minimal, there is no great need to enlarge the scan area in the main scanning direction.

If a determination is made in step 104 that the distortion aberration correction is not required, the operation is shifted to step 108. Thus, the scan area for the fine scan is set to be the size C, which is the same as the print size. Then, the foregoing scan area setting routine is completed.

The thus-set reading conditions, including the scan area, for the fine scan are communicated to the line CCD scanner 14. The setup section 226 sets a variety of image processing conditions including the gradation adjustment and the gray balance adjustment to communicate the same to the parameter unifying section 230. The parameter unifying section 230, to which the image processing conditions have been communicated, communicates the same to the prescan processing section 212 and the fine scan processing section 218.

After the reading conditions including the scan area have been set to all of the frame images recorded on the photographic film 68, the film carrier 74 moves the photographic film 68 in the direction opposite to the direction in which the prescan is performed to perform the fine scan of each of the frame images.

Since the photographic film 68 is, at this time, moved in the opposite direction to the direction in which the prescan is performed, fine scan is sequentially performed from the final frame to the first frame. The fine scan is performed at a low movement speed as compared with the movement speed for the prescan. Thus, the reading resolution is therefore raised. When prescan is performed, the state (for example, the aspect ratio of the photographed image, the photographing conditions whether or not the condition is under, normal, over or superover and whether or not electronic flash has been operated) of the image is recognized. Therefore, the image can be read under appropriate reading conditions. When the fine scan is performed, only the scan area set as described above is read.

Fine scan data supplied to the fine scan memory 206 is read by the fine scan processing section 218. The distortion aberration correction section 222 provided for the image data processing section 214 of the fine scan processing section 218 subjects fine scan data to the distortion aberration correction. The correction is performed under the predetermined image processing conditions. That is, the correction is performed on the basis of the amount of the distortion aberration of the photographing lens. Fine scan data subjected to the distortion aberration correction is subjected to image processing similar to the image processing performed by the prescan processing section 212. Moreover, fine scan data is, by the image data converting section 216, converted into image data in the color system suitable to the laser printer section 18 so as to be output as image data to be recorded.

In the laser printer section 18, the photographic paper 62 is illuminated with a laser beam modulated in accordance with image data to be recorded so that the image is recorded. The processor section 20 subjects the photographic paper 62 on which the image has been recorded by the laser printer section 18 to a variety of processing including color development, bleaching and fixing, washing with water and drying. Thus, the image is formed on the photographic paper 62.

In this embodiment, information about the photographing lens provided for the camera is obtained. In accordance with obtained information about the photographing lens, the scan area for the fine scan is set. Then, the set scan area is read. When image data, which is to be recorded and which is obtained by subjecting read fine scan data to the image processes including the distortion aberration correction, is used to form an image on the photographic paper 62, an image free from distortion can be formed on the photographic paper 62. That is, missing image regions caused by the distortion aberration correction can be prevented.

Figure 6:
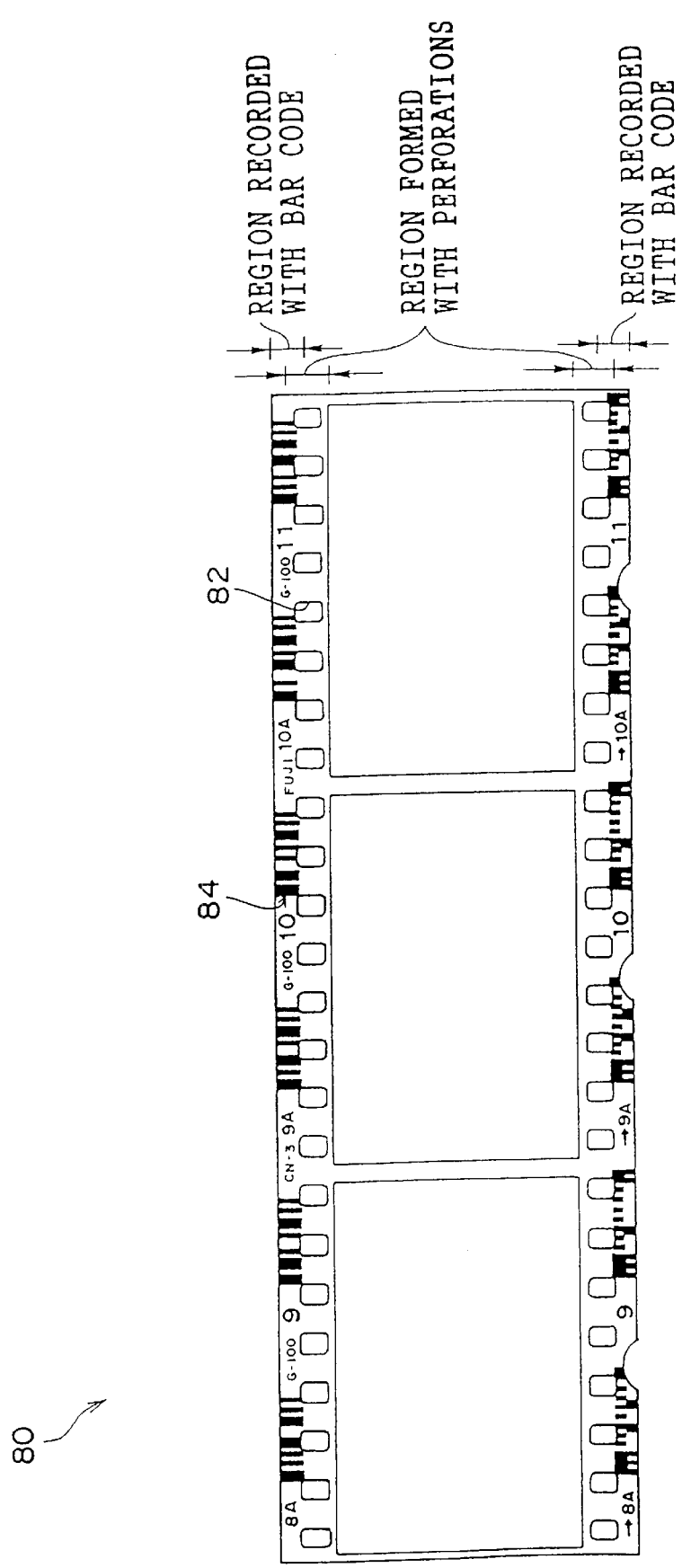
FIG. 6 is an enlarged view showing a photographic film (135-size).

In this embodiment, the photographic film 68 is an APS film. The film is not limited to the APS film. For example, the present invention may be applied to the foregoing 135-ize photographic film, the 110-size photographic film, the 120-size photographic film and the 220-size (the Brownie size) photographic film. When the 135-size photographic film 80 is employed as shown in FIG. 6, the type of the film may be determined in accordance with the shape (perforations 82 are formed at relatively short pitches at the two widthwise directional ends) of the photographic film 80. Information about the print size and the photographing lens may previously be recorded in the bar code 84. A sensor reads the bar code 84 to determine information.

In this embodiment, information about the type of the photographic film 68, the print size and the photographing lens is automatically determined. The present invention is not limited to this. For example, an operator may determine information and directly input information by using the keyboard 16K. In this embodiment, the determination as to whether or not fine scan data must be subjected to the distortion aberration correction is performed in accordance with information about the photographing lens provided for the camera. The present invention is not limited to this. The determination may be performed such that the operator observes and determines an image displayed on the monitor 16M in accordance with prescan data. Information about the camera with which the image has been photographed may be used to determine whether or not the distortion aberration correction must be performed.

Figure 7A:
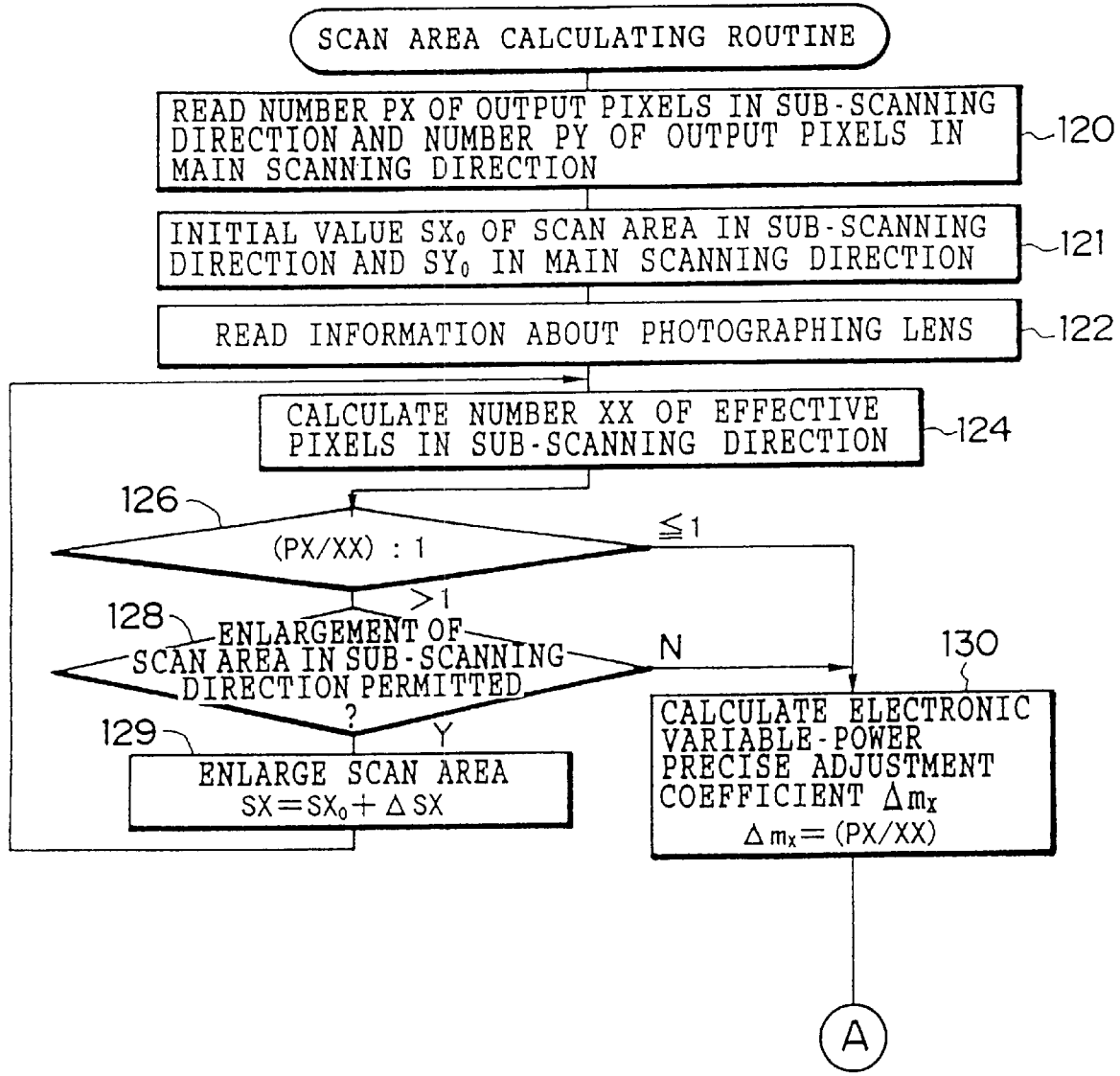
FIGS. 7A and 7B are flowcharts of a scan area calculating. routine according to another embodiment of the present invention.
Figure 7B:
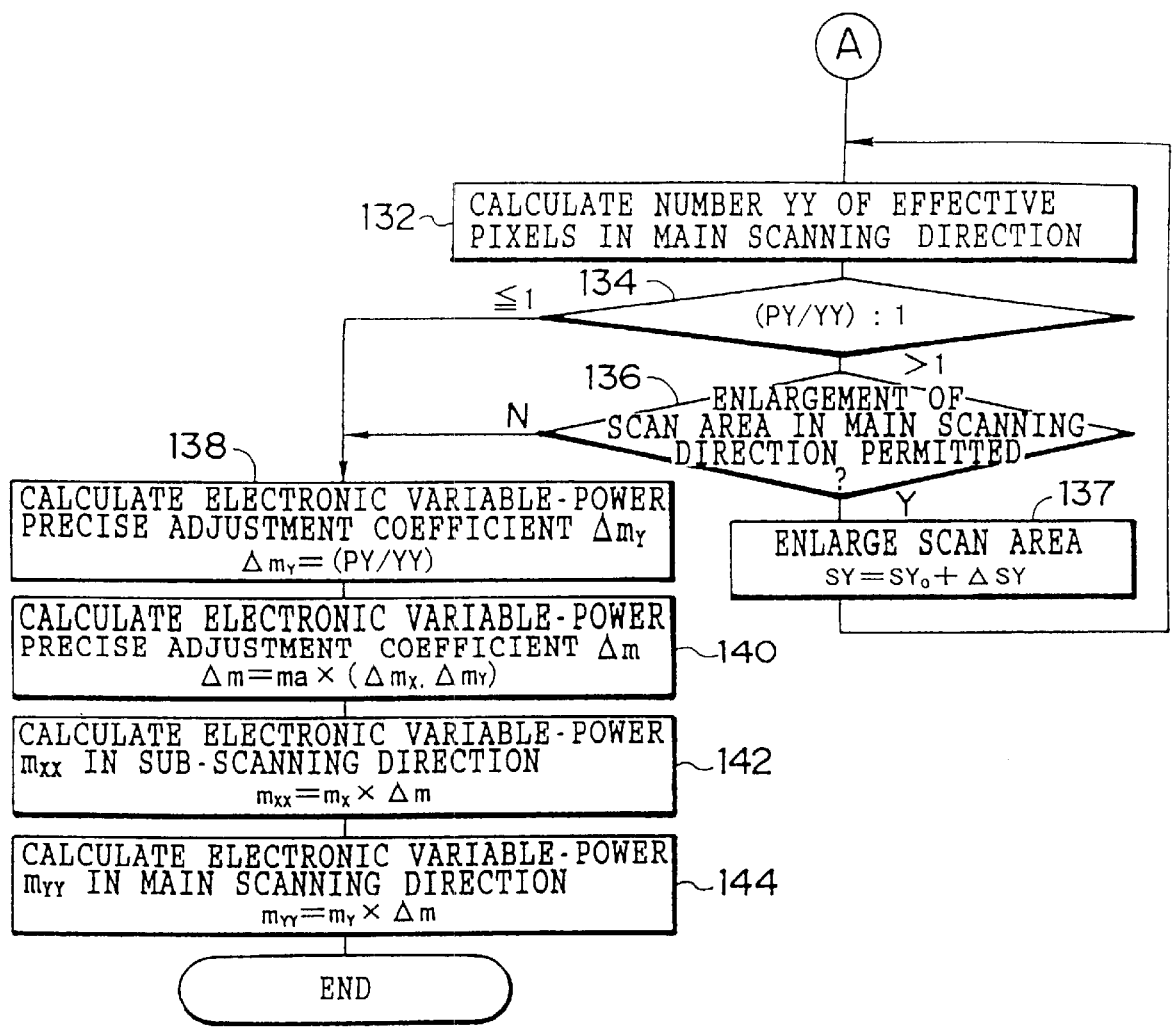
Figure 8B:
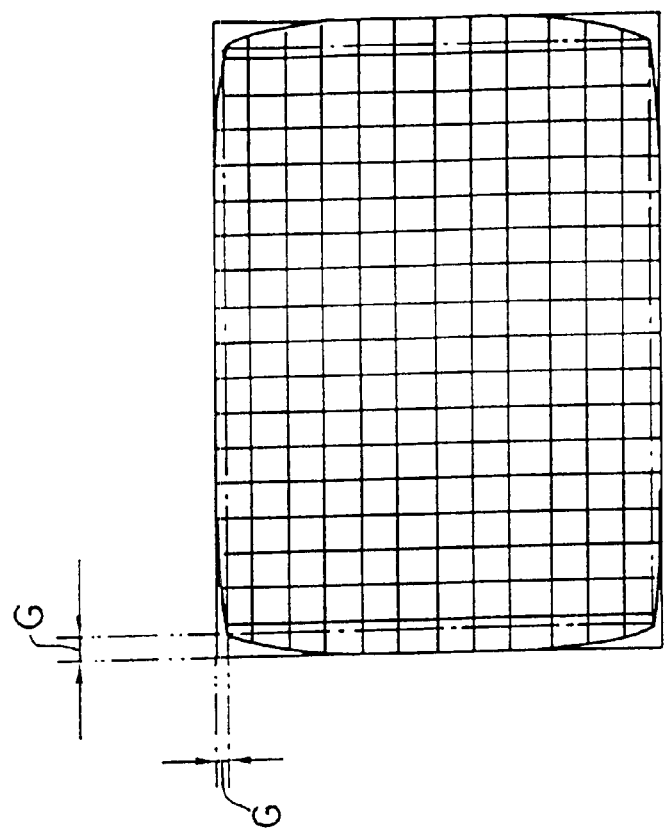
FIG. 8B is a schematic view showing an image output by using image data which has been obtained by subjecting image data obtained by reading the frame image shown in FIG. 8A to distortion aberration correction and which must be recorded.
Figure 8A:
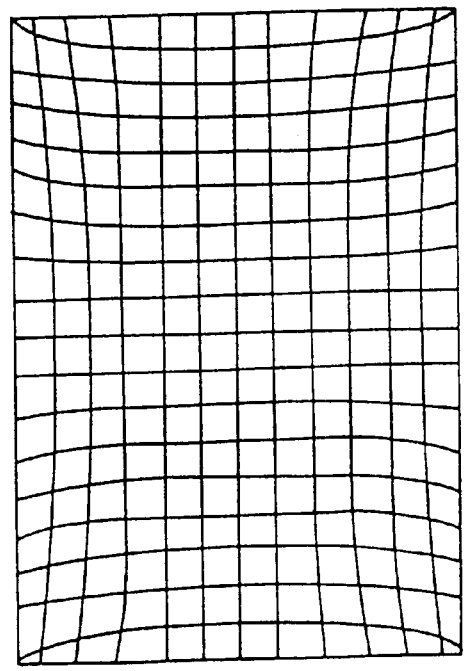
FIG. 8A is a schematic view showing a frame image having distortion caused by distortion aberration of the photographing lens.

In this embodiment, has been described the process for setting the scan area when the frame image recorded on the photographic film 68 has the size H and the image (the print size) which is formed on the recording material has the size C. The present invention is not limited to the foregoing size of the frame image and the print size. That is, the scan area for the fine scan may be set by performing calculations in accordance with the following ratio: the ratio is a ratio between a range in the image permitted to be used as the image which is recorded on the recording material, the image being indicated with image data in a state before the distortion aberration correction, and a range in the image permitted to be used as the image which is formed on the recording material, the image being indicated with image data subjected to the distortion aberration correction. The foregoing process will now be described with reference to a scan area calculating routine shown in FIGS. 7A and 7B.

In step 120 the number PX of output pixels of the frame image recorded on the photographic film in the sub-scanning direction and the number PY of output pixels in the main scanning direction aspect ratio are read. As a result, the print size of the frame image which has been recorded on the photographic film and which will be formed on the photographic paper can be read. In step 121 initial values $SX_0$ and $SY_0$ of the scan area are set. The initial values $SX_0$ and $SY_0$ are set to satisfy the relationship shown in the following equations (1) and (2). Note that symbols $m_x$ and $m_y$ shown in equations (1) and (2) are electronic variable power ratios in the sub-scanning direction and the main scanning direction, respectively.

$$PX = m_x \times SX_0 \qquad (1)$$

$$PY = m_y \times SY_0 \qquad (2)$$

In step 122 information about the photographing lens provided for the camera is read. If the APS film is employed as the photographic film, information about the photographing lens can be read by causing the magnetic head to read the magnetic recording layer. In a case of the 135-size photographic film, information can be read by causing the sensor to read the bar code.

In step 124 the number XX of effective pixels in the sub-scanning direction is calculated in accordance with information about the photographing lens read in step 122. The number of the effective pixels is the number of pixels obtained by subtracting uncertain pixels which are produced when an image has been formed by using image data to be recorded and which has been subjected to the distortion aberration correction.

In step 126 references to the number PX of output pixels read in step 120 and the number XX of effective pixels calculated in step 124 are made to make a comparison between the value of (number PX of output pixels/number XX of effective pixels) and "1". If a determination is made in step 126 that the value of (number PX of output pixels/ number XX of effective pixels) is larger than "1", the operation is shifted to step 128.

In step 128 a determination is made whether or not a scan area SX in the sub-scanning direction can be enlarged. If the scan area SX can be enlarged, the scan area is enlarged by a predetermined amount ΔSX which has been calculated in step 129 (refer to equation (3)). The predetermined amount ΔSX has an upper limit which is determined by the image area of the original document. The predetermined amount ΔSX is required to minimize the missing image region.

$$SX = SX_0 + \Delta SX \tag{3}$$

After the scan area has been enlarged in step 129, the operation is shifted to step 124 so that a process similar to the foregoing process is performed.

If a determination is made in step 126 that the value of (number PX of output pixels/number XX of effective pixels) is smaller than "1" or if a determination is made in step 128 that the scan area in the sub-scanning direction cannot be enlarged, the operation is shifted to step 130.

In step 130 the electronic variable-power-ratio precise adjustment coefficient Am is calculated in accordance with the following equation (4):

$$\Delta m_X = (PX/XX) \tag{4}$$

In step 132 the number YY of effective pixels in the main scanning direction is calculated by a method similar to that employed in step 124. In step 134 references to the number PY of output pixels read in step 120 and the number YY of effective pixels calculated in step 132 are made to make a comparison between the value (number PY of output pixels/number YY of effective pixels) and "1". If a determination is made in step 134 that the value (number PY of output pixels/number YY of effective pixels) is larger than "1", the operation is shifted to step 136. In step 136 a determination is made as to whether or not the scan area SY in the main scanning direction can be enlarged.

If a determination is made in step 136 that the scan area SY can be enlarged, the operation is shifted to step 137. In step 137 the scan area SY is enlarged by a predetermined amount ΔSY which has been calculated (refer to equation (5)). The predetermined amount ΔSY is calculated by a method similar to that employed to calculate the predetermined amount ΔSX.

$$SY = SY_0 + \Delta SY \tag{5}$$

After the scan area has been enlarged in step 137, the operation is shifted to step 132 so that a process similar to the foregoing process is performed.

If a determination is made in step 134 that the value (number PY of output pixels/number YY of effective pixels) is not larger than "1" or if a determination is made in step 136 that the scan area in the main scanning direction cannot be enlarged, the operation is shifted to step 138. In step 138 the electronic variable-power-ratio precise adjustment coefficient Δm$_Y$ is calculated in accordance with the following equation (6):

$$\Delta m_Y = (PY/YY) \tag{6}$$

In step 140 the electronic variable-power-ratio precise adjustment coefficient Δm is calculated by extracting maximum values of the electronic variable-power-ratio precise adjustment coefficient Δm$_X$ calculated in step 130 and the electronic variable-power-ratio precise adjustment coefficient Δm$_Y$ calculated in step 138 (refer to equation (7)).

$$\Delta m = \max(\Delta m_X, \Delta m_Y) \tag{7}$$

After the electronic variable-power-ratio precise adjustment coefficient Δm has been calculated, the electronic variable-power ratio m$_{XX}$ in the sub-scanning direction and the electronic variable-power ratio m$_y$ in the main scanning direction are calculated in steps 412 and 144 in accordance with the following equations (8) and (9):

$$m_{XX} = m_X \times \Delta m \tag{8}$$

$$m_{YY} = m_Y \times \Delta m \tag{9}$$

The electronic variable-power ratio m$_{XX}$ in the sub-scanning direction and the electronic variable-power ratio m$_{YY}$ in the main scanning direction are used to set the scan area. The foregoing calculations are performed when the value of each of (number PX of output pixels/number XX of effective pixels) and (number PY of output pixels/number YY of effective pixels) is larger than "1". Therefore, the electronic variable-power ratio m$_{XX}$ in the sub-scanning direction and the electronic variable-power ratio m$_{YY}$ in the main scanning direction are larger than the corresponding electronic variable power ratios m$_X$ and m$_Y$. The foregoing fact corresponds to setting of the scan area to a range larger than the print size.

The scan area may be set by calculating the electronic variable-power ratio m$_{XX}$ in the sub-scanning direction and the electronic variable-power ratio m$_{YY}$ in the main scanning direction whenever fine scan is performed.

In the foregoing description, the scan area is set by calculating the electronic variable-power ratio m$_{XX}$ in the sub-scanning direction and the electronic variable-power ratio m$_{YY}$ in the main scanning direction whenever fine scan is performed. An arrangement may be employed in which scan areas corresponding to information items of a plurality of photographing lenses are previously calculated and stored in a table or the like. In this case, the scan area corresponding to read information about the photographing lens is read from the table to set the scan area. As a result, the necessity of performing the calculating processing whenever the fine scan is performed can be eliminated. Therefore, the number of processings can be reduced.

Here, the enlargement of the scan area (above steps 129, 137) may be carried out by a zoom lens system (see FIG. 9A) utilizing a zoom lens, or by a conjugate length variable system (see FIG. 9B) which uses a single focal point lens 77 and in which the single focal point lens 77 and the line CCD 30 are moved independently along the optical axis.

The conjugate length variable system will be described in further detail hereinafter. As illustrated in FIG. 9B, given that the distance between the photographic film 68 and the single focal point lens 77 is a, the distance between the single focal point lens 77 and the line CCD 30 is b, the distance between the photographic film 68 and the line CCD 30 is L, the focal length of the single focal point lens 77 is f, and the optical magnification is mopt, then the following equations are established.

$$\frac{1}{a} + \frac{1}{b} = \frac{1}{f}$$

$$a + b = L$$

$$m_{opt} = \frac{b}{a}$$

When the single focal point lens 77 and the line CCD 30 are moved independently along the optical axis, the respective equations of above formula 10 are changed to the following equations.

$$\frac{1}{a'} + \frac{1}{b'} = \frac{1}{f}$$

$$a' + b' = L'$$

$$m'_{opt} = \frac{b'}{a'}$$

As can be understood from the optical magnifications $m_{opt}$ and $m_{opt}'$ in the above equations, by making the optical magnification smaller, the scan area can be enlarged. Namely, the optical magnification is set to a predetermined fixed value such that the scan area becomes a range which is larger, by a predetermined amount or more, than the range used as the output image.

Figure 10:
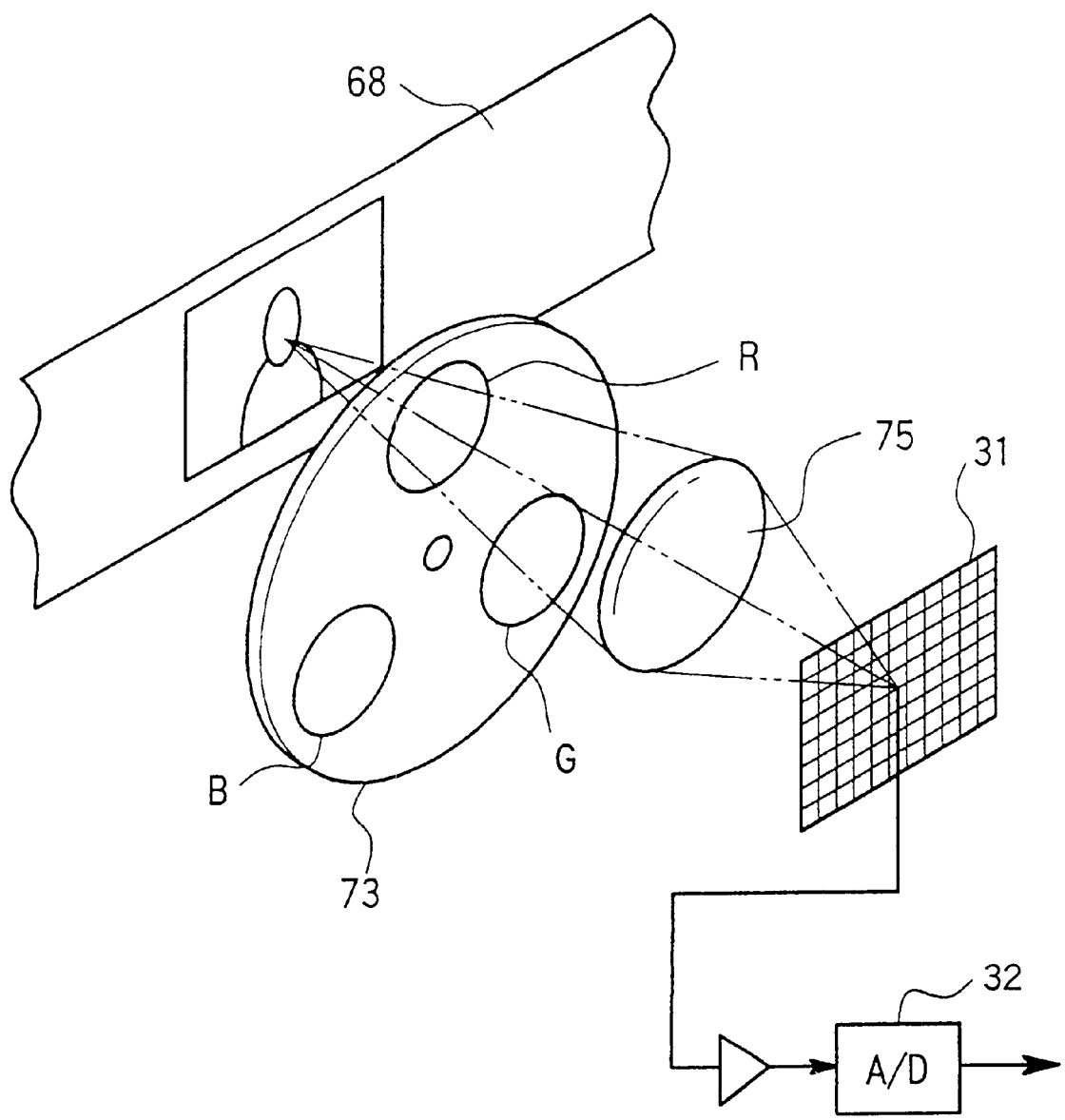
FIG. 10 is a diagram illustrating a concrete example of an area CCD sensor.

Although a line CCD is used in the above-described embodiment, the present invention is not limited to the same. As illustrated in FIG. 10, an area CCD sensor 31 which reads the photographic film 68 in areas may be used. Namely, R, G, B filters are disposed on the optical axis, and areas of the photographic film 68 are read via the filters and the lens 75. When a line CCD is used, the scan area in the main scanning direction and the scan area in the subscanning direction are enlarged separately (steps 124–130, and steps 132–138). However, when an area CCD sensor is used, the scan area is enlarged by adjusting both the main scanning direction and the subscanning direction. The enlargement of the scan area in this case may be carried out by using the aforementioned zoom lens system or conjugate length variable system. Further, when a line CCD is used, the subscanning direction scan area may be enlarged independently by adjusting the reading time of the line CCD.

Figure 11:
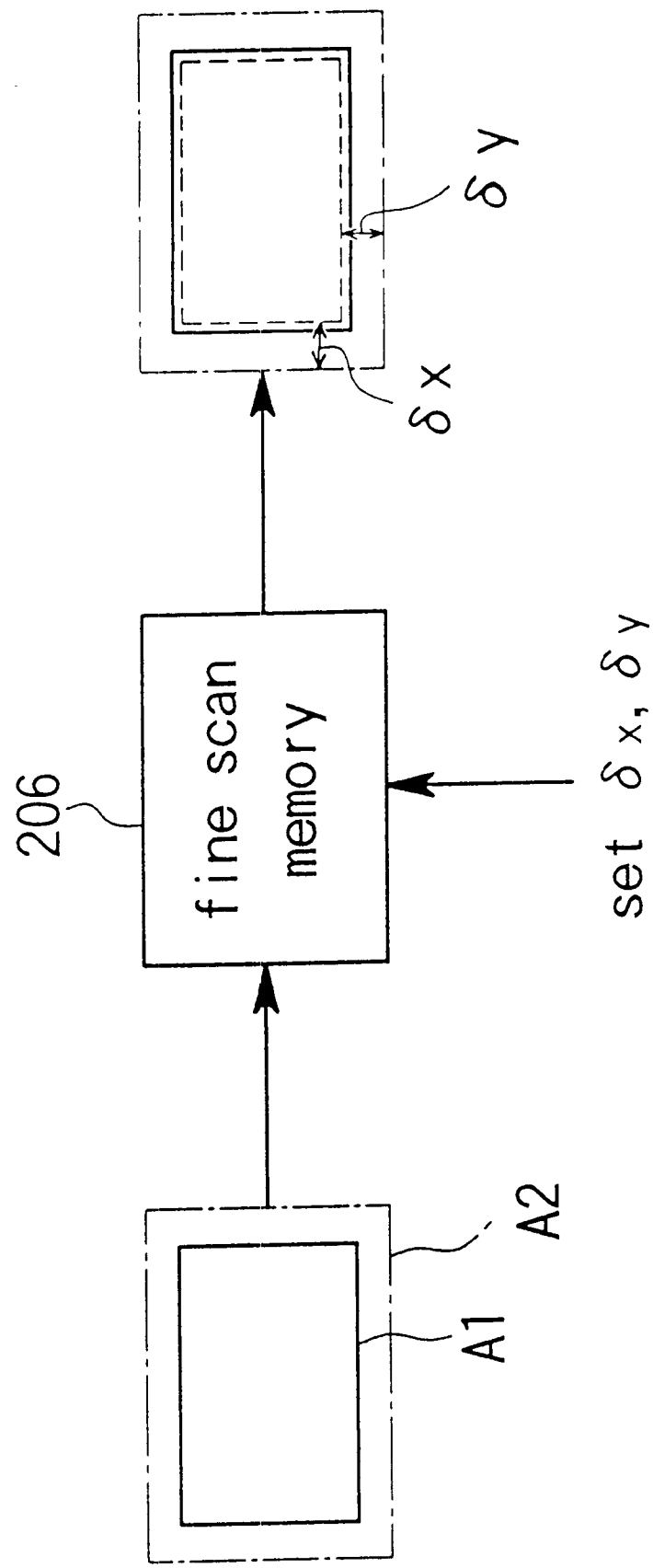
FIG. 11 is a schematic view illustrating the adjusting of a reading range by adjusting a range of image data read from a fine scan memory 206.

Although the scan range is enlarged in the above embodiment, the present invention is not limited to the same. As illustrated schematically in FIG. 11, a range of reading image data from a fine scan memory 206 may be adjusted. Namely, image data, which is obtained by a line CCD sensor or an area CCD sensor reading an area A2 which is greater than an image area A1 of the photographic film, is stored in the fine scan memory 206. When this image data is read, reading is carried out while adjusting both widths $\delta_Y$ in the main scanning direction and both widths $\delta_X$ in the subscanning direction of the image, so as to adjust the reading range.

In this embodiment, the frame images recorded on the photographic film 68 are read. Image data which must be recorded is obtained by subjecting read image data to the distortion aberration correction. Image data to be recorded is used to form an image on the photographic paper 62. The method of outputting the image is not limited to the foregoing method. For example, image data be recorded may be displayed on a monitor. Image data to be recorded may be stored in an information storage medium.

What is claimed is:

1. An image processing apparatus comprising:
    determining means for determining whether or not image data obtained by reading an image recorded on a photographic film requires distortion aberration correction for correcting distortion caused by distortion aberration of a photographing lens used to record the image on the photographic film; and
    reading-range setting means for setting an image reading range to be substantially the same as a range used for an output image, when said determining means determines that distortion aberration correction is not required, and for setting the image reading range to a range that is larger than the range used for the output image by a predetermined amount when it is determined that distortion aberration correction is required.

2. An image processing apparatus according to claim 1, further comprising lens-information obtaining means for obtaining information about the photographing lens, wherein when said determining means determines that distortion aberration correction is required, said reading-range setting means obtains a range that is used to output an image that has been subjected to the distortion aberration correction based on the obtained photographing lens information, and said reading-range setting means also calculates and sets an image reading range in accordance with the size of the usable range.

3. An image processing apparatus according to claim 2, wherein information about the photographing lens includes camera identification information for identifying the type of camera in which the photographing lens is provided.

4. An image processing apparatus according to claim 3, wherein the camera identification information enables a determination as to whether or not the camera is a lens-fitted film package.

5. An image processing apparatus according to claim 1, further comprising lens-information obtaining means for obtaining information about the photographing lens, wherein said reading-range setting means pre-stores an image reading range for each of a plurality of photographing lenses, and reads and sets the image reading range corresponding to the obtained lens-information when said determining means determines that distortion aberration correction is required.

6. An image processing apparatus according to claim 1, further comprising reading means for reading the image.

7. An image processing apparatus according to claim 6, wherein said reading means includes a scanner for scanning and reading the image at a first velocity.

8. An image processing apparatus according to claim 7, wherein said scanner scans the image reading range set by said reading-range setting means at a second velocity higher than the first velocity.

9. An image processing apparatus according to claim 7, wherein said scanner is a line CCD scanner.

10. An image processing apparatus according to claim 1, wherein said determining means detects the type of the photographing lens used in order to determine whether or not distortion aberration correction is required.

11. An image processing apparatus according to claim 10, wherein the type of the photographing lens is detected based on information recorded on a magnetic recording layer on the photographic film.

12. An image processing apparatus according to claim 1, further comprising fine scan means for fine scanning the image reading range set by said reading-range setting means.

13. An image processing apparatus according to claim 12, further comprising output means for outputting the image scanned by said fine scan means.

14. An image processing apparatus according to claim 1, wherein the image reading range is a scan range of the photographic film wherein the scan range is read in turn by an image reading means that reads images recorded on photographic films.

15. An image processing apparatus according to claim 14, wherein said image reading means is an area sensor which reads the image in areas, and
    wherein said reading-range setting means changes the scan range by changing the optical magnification of the area sensor.

16. An image processing apparatus according to claim 15, wherein in a case in which said determining means determines that the distortion aberration correction is required, said reading-range setting means sets the optical magnification to a predetermined fixed value, so that the image reading range is larger than, by at least a predetermined amount, the range used for the output image.

17. An image processing apparatus according to claim 14,
wherein said image reading means is a line sensor which reads the image in lines, and
wherein said reading-range setting means changes the scan range by changing at least one of the optical magnification and the subscanning range of the line sensor.

18. An image processing apparatus according to claim 17,
wherein said reading-range setting means changes the scan range by changing the optical magnification of the line sensor, and
wherein, in a case in which said determining means determines that the distortion aberration correction is required, said reading-range setting means sets the optical magnification to a predetermined fixed value such that the image reading range is larger than, by at least a predetermined amount, the range used for the output image.

19. An image processing apparatus according to claim 1, further comprising:
storing means for storing image data obtained by reading the image recorded on the photographic film,
wherein the image reading range is a range of reading image data from said storing means.

20. An image processing apparatus according to claim 1, further comprising:
changing means for changing an electrical magnification such that the output image is a predetermined size.

21. An image processing apparatus, comprising:
a scanner for reading frame images recorded on a photographic film by a lens of a camera, wherein digital image data output therefrom is subjected to predetermined image processing, converted to density data and stored as prescan data and fine scan data;
a first image processing section receiving the prescan data and displaying an output image from the prescan data; and
a second image processing section receiving the fine scan data, subjecting the fine scan data to corrections and converting the corrected data to an output image that is printed out, wherein the second image processing section includes a distortion aberration correction unit that corrects for any distortion aberrations that are present in frame images and which result from the lens, by enlarging a scan area of the film so as to prevent the occurrence of missing image regions in the subsequent output image.

22. The apparatus of claim 21, wherein the scan area is enlarged in the sub-scanning direction of the film.

23. The apparatus of claim 21, wherein the size of the scan area is larger as compared to a scan area size set for printing the image.

24. The apparatus of claim 22, wherein the scan area is also enlarged in the main scanning direction of the film.

25. An image processing method, comprising:
reading image data recorded on a film by a lens of a camera;
determining whether or not the read image data requires distortion aberration correction that is caused by the lens during the recording of image data on the film; and
setting a scan area based on the determination,
wherein the scan area is set to be substantially equal to a scan area used for an output image if no distortion aberration correction is required, and
wherein the scan area is set to be larger than the scan area used for an output image if distortion aberration correction is required, thereby preventing the occurrence of missing image regions in the subsequently output image.

26. The method of claim 25, further comprising obtaining lens information about the lens, wherein the scan area to be set is calculated based on the obtained lens information when distortion aberration correction is required.

27. The method of claim 25, wherein said step of determining includes detecting the type of lens used to record the images on the film in order to determine whether distortion aberration correction is required.

28. A method of setting a scan area in an image processing apparatus, comprising:
(a) determining whether or not film is inserted into a carrier;
(b) determining whether or not a print size for images of the film is a specified print size, if it is determined that the film is in the carrier;
(c) setting the scan area to be substantially equal a scan area used to output the specified print size if no distortion aberration correction is determined to be required; or
(d) setting the scan area to be larger than the scan area used to output the specified print size, if distortion aberration correction is required.

29. The method of claim 28, wherein if step (d) is performed, the scan area is enlarged a predetermined amount in the sub-scanning direction of the film to compensate for distortion aberration, thereby preventing the occurrence of missing regions in an outputted image.

30. The method of claim 28, wherein steps (c) or (d) are performed only for a fine scan of the film within the apparatus.

* * * * *